United States Patent [19]

Takahama

[11] 3,770,223
[45] Nov. 6, 1973

[54] MAGAZINE FOR AN ENDLESS FILM
[75] Inventor: Sho Takahama, Nishinomiya-shi, Hyogo, Japan
[73] Assignee: Fuji Photo Film Co., Ltd., Kanagawa, Japan
[22] Filed: Apr. 14, 1972
[21] Appl. No.: 244,167

Related U.S. Application Data
[63] Continuation-in-part of Ser. No. 26,572, April 8, 1970, abandoned.

[30] Foreign Application Priority Data
Apr. 17, 1969   Japan................................ 44/29837

[52] U.S. Cl. ......................... 242/55.19 A, 352/128
[51] Int. Cl. ........................................... B65h 17/48
[58] Field of Search .......................... 242/55.19 A; 352/128, 78, 72

[56] References Cited
UNITED STATES PATENTS
| 3,065,310 | 11/1962 | Cross | 242/55.19 A |
|---|---|---|---|
| 2,908,769 | 10/1959 | Fonda | 242/55.19 A |
| 2,853,923 | 9/1958 | Daniel | 242/55.19 A |
| 3,285,526 | 11/1966 | Moore | 242/55.19 A |
| 3,305,296 | 2/1967 | Nicosia | 242/55.19 A |

FOREIGN PATENTS OR APPLICATIONS
1,359,359   3/1964   France .......................... 242/55.19 A Primary Examiner—Billy S. Taylor
Attorney—Richard C. Sughrue et al.

[57] ABSTRACT

A film magazine carries an endless film which is wrapped about a hub portion on a flange extending at a right angle to the axis of the hub, the hub having a first cylindrical portion in contact with the inntermost convolution of the film near the flange, and having a tapered hub portion remote from the flange. A rib within the cover of the film magazine which maintains the film convolutions on the hub in proper position is recessed at the point where it overlies the innermost film convolution and a portion of the tapered surface portion, the rib being positioned circumferentially at the point where the innermost convolution leaves the hub, the depth of the recess within the rib and the demarcation between the tapered portion of the hub and the cylindrical portion of the hub is approximately equal to the thickness of the film to insure edge contact only between the innermost convolution and the point of removal from the hub and the tapered surface portion of the hub and the rib respectively.

2 Claims, 3 Drawing Figures

PATENTED NOV 6 1973  3,770,223

MAGAZINE FOR AN ENDLESS FILM

CROSS-REFERENCE TO RELATED APPLICATION

This application is a continuation in part application of application Ser. No. 26, 572, filed Apr. 8, 1970, identically entitled, not abandoned.

BACKGROUND OF THE INVENTION

1. Field of the Invention

The present invention relates to magazines for holding endless films, and in particular to a magazine for an endless movie film which is adapted for use with movie projectors.

2. Description of the Prior Art

In conventional endless film reels, as illustrated in FIG. 1, the hub 2 is provided with a tapered circumferential portion 20, and has integrally coupled thereto a flange 1 at the small diameter side of the hub 2 with the endless film 3 wound upon the hub. The hub 2 with the flange 1 integrally formed therewith, has coupled thereto a cover plate 4 which includes radially extending ribs 5 which press the wound film 3 against flange 1 to align the individual turns. The ribs 5 thus prevent the endless film 3 carried by the hub 2 from being displaced from position. The film 3 is removed from the space existing between the cover plate 4 and the adjacent edge of the wound film 3 from the inside of the coil or convoluted film. The removed film 3' is returned to the outside periphery or outer convolution of the endless film after passing through the projecting mechanism of the movie projector.

The film carried by the conventional endless film reel illustrated in FIG. 1, is therefore liable to be damaged or scratched as it is removed by contact with the edge of the hub 2, in particular, at edge 21. Since the hub 2 is tapered such that the end opposite that of the fixed flange is of largest diameter, it is necessary to mold the flange and the hub as separate units rather than to form the same integrally. Not only is there the possibility of scratching the film, but the molds for forming the flange and the hub are accordingly complicated, and the cost is increased.

In handling movie film as contrasted to magnetic tape, it is very important to handle it so as to prevent scratches being formed on the surface of the film, since it is impossible to sharply and faithfully project the image on the film onto a projection screen if the film is damaged by surface scratches and the like.

SUMMARY OF THE INVENTION

The present invention is therefore directed to an improved magazine for an endless film in which the film may be easily removed without damage to the surface of the film, and the magazine in turn may be easily manufactured.

DESCRIPTION OF THE PREFERRED EMBODIMENT

Figure 1:
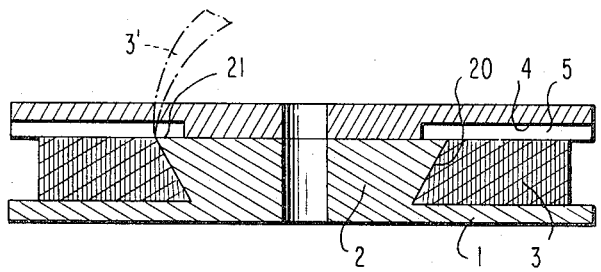
FIG. 1 is a sectional view of a conventional reel carrying an endless film.
Figure 3:
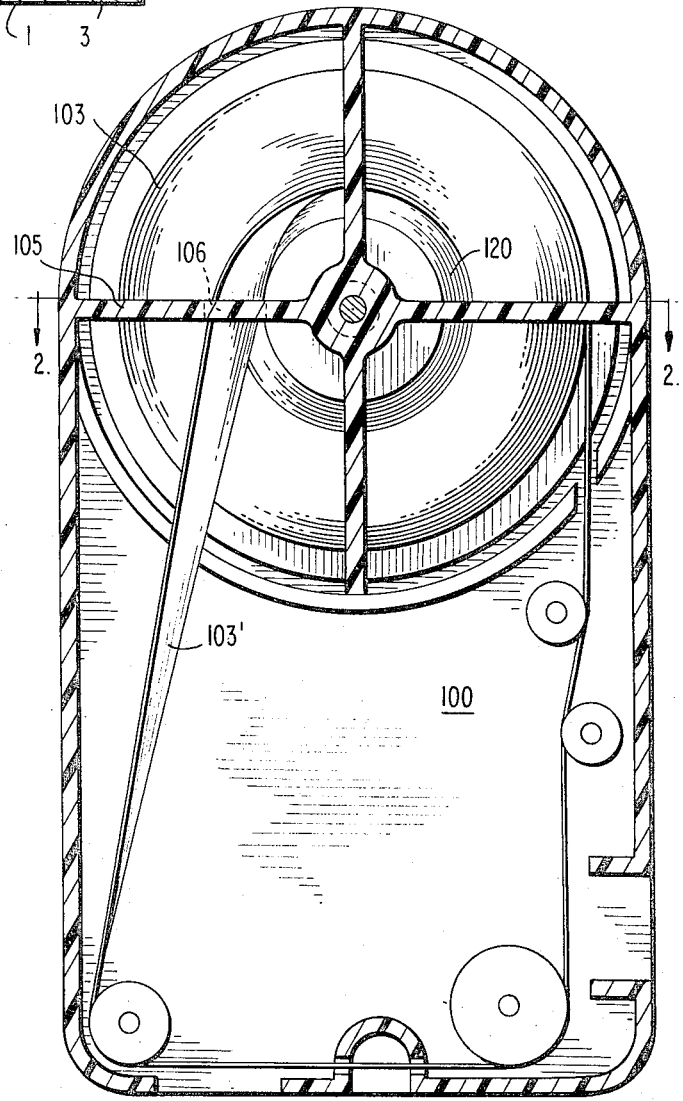
FIG. 3 is a schematic, plan view of the endless film magazine in accordance with the present invention.
Figure 2:
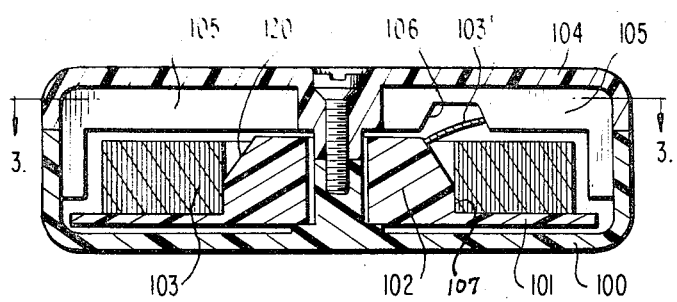
FIG. 2 is a sectional view of an improved magazine for holding an endless film in accordance with the present invention.

Referring to FIGS. 2 and 3, a hub 102 having a tapered circumferential surface portion 120 is rotatably mounted in a magazine body portion 100 with the hub 102 having a flange 101 integrally formed therewith on the larger diameter side or end thereof. Tapered surface portion 120 terminates in a cylindrical wall 107 which extends at right angles to flange 101. An endless film 103 is wound on the hub 102 and the body portion 100 has coupled thereto an overlying cover portion 104, which is specially fitted to the body portion 100. The cover portion 104 is provided with radially extending ribs 105 on the inside surface thereof at spaced circumferential positions with at least one of the ribs 105 being provided with a notched or recessed portion 106 facing tapered hub surface portion 120 and aligned with wall 107, for guiding the film portion 103' as it is removed from the center of the film convolutions and passes above the same as best seen in FIG. 3. The height of the wall 107 is generally equal to the depth of recess 106. The film portion 103' is removed from the coils or convolutions surrounding hub 102 in the magazine of the present invention easily through the space existing between the tapered circumferential surface portion 120 of the hub 102 and the last convolution of the coil film 103 is further guided during removal by guiding recess 106 formed within the radial extending rib 105 of the cover portion 104. The removed film portion 103' is easily introduced into the projecting mechanism of the movie projector and returned through suitable guides to the outermost peripheral film convolution. Thus, the endless film 103 forms a loop exteriorly of hub 102. The film feeding mechanism for the projector may be of any type such as by claw or the like feeding the film intermittently or by a capstan and pinch roller for feeding the film continuously. The height of wall 107, the tapering of the hub surface as at 120 and the depth of the recess 106 are such that throughout removal of the innermost convolution, edge contact is assured for both edges of the film with the tapered hub surface and the bottom of the rib recess without bringing the emulsion on the film in contact with the hub or the rib, whereby, there is no possibility of abrasion of the emulsion once the innermost convolution rises above the height of wall 107.

In accordance with the improved magazine of the present invention, the film which is wound on the hub is undamaged either by the friction existing between the inner convolution and the hub when the film is removed due to its limited contact with the inner tapered surface 120 of the hub or scratched since during removal it does not contact a sharp tapered end of the same. Due to the spacing between the hub periphery 120 and the innermost convolution of film 103, the film runs smoothly therethrough and through the guide recess 106 within rib 105 on the inner side of cover 104. Further, since the flange 101 is fixed to the hub 102 at the larger diameter side thereof, the magazine with the exception of the cover may be formed from a single mold, greatly reducing the cost of the same.

What is claimed is:

1. A magazine for an endless photographic film comprising: a body portion, a cover portion overlying said body portion, a rotatable hub carried within said body portion and wound with an endless photographic film with the rotational axis thereof being orthogonal to the wall of the cover portion, the improvement comprising:

said hub including a circumferential surface portion tapered such that the small diameter side of the hub faces said cover portion, a radial flange extending outwardly from said hub at the large diameter side thereof and edge supporting the wound convolutions of said film, and at least one rib carried on the internal surface of said cover portion for aligning the edges of the film convolutions carried by said hub, whereby said endless film is wound onto the hub at the outer periphery thereof, said rib being circumferentially aligned with the point on said hub wherein the innermost convolution of said film breaks contact with said hub during tangential removal therefrom, said rib being provided with a recess lying opposite said tapered circumferential surface portion of said hub with said recess being of a depth such that during removal of the innermost film convolution, the film contacts only the bottom of the recess at one edge and the tapered surface of the hub with the other edge to insure removal of the film at said innermost convolution without abrasion to the emulsion carried thereby.

2. The magazine as claimed in claim 1, wherein said radial flange is defined by a right angle cylindrical wall intercepting said tapered circumferential surface portion of said hub, said cylindrical wall being in radial alignment with said recess within said rib with the height of the wall corresponding generally to the depth of the recess to insure edge contact of said film with said recess and said tapered hub surface portion during tangential removal of said innermost film convolution.

* * * * *